D. B. MORISON.
APPARATUS FOR WITHDRAWING FLUIDS FROM VESSELS.
APPLICATION FILED AUG. 8, 1918.
1,280,809.
Patented Oct. 8, 1918.
4 SHEETS—SHEET 2.
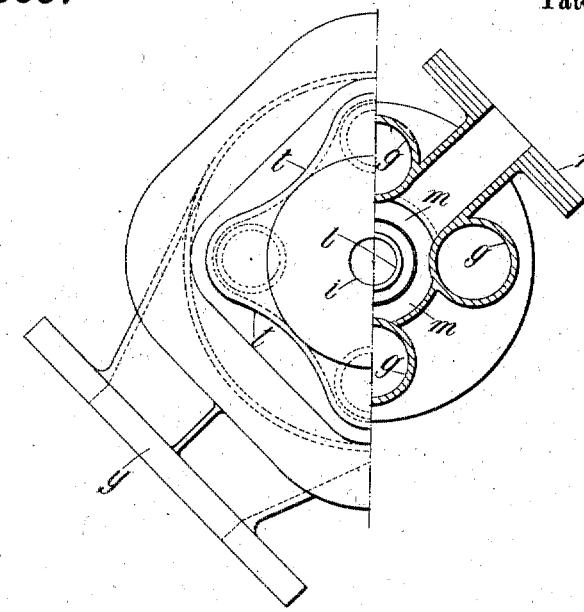
Fig. 2.
Fig. 3.
Fig. 4.
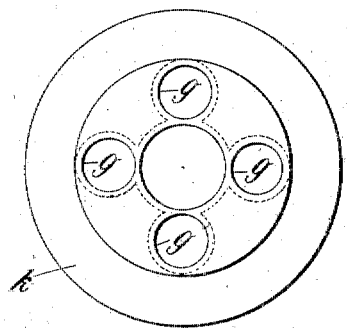
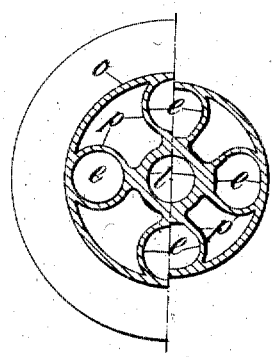
Fig. 5.
Fig. 6.
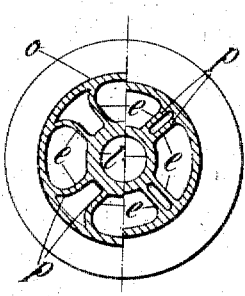
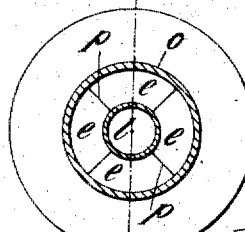
Inventor:
Donald Barns Morison,
by
Attys.

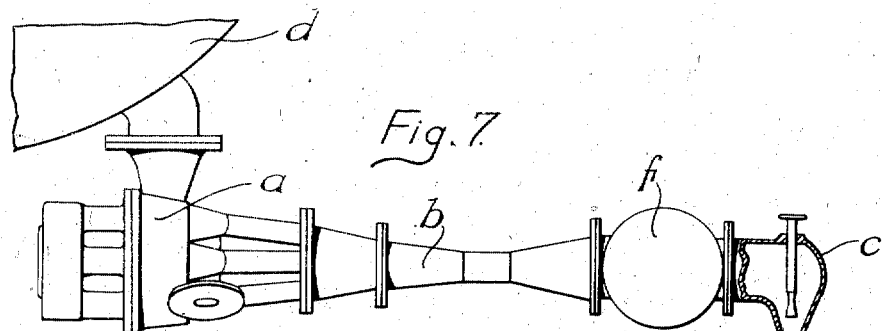
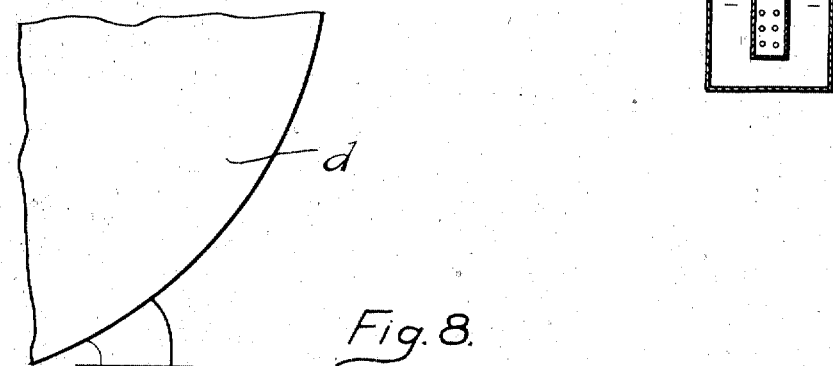
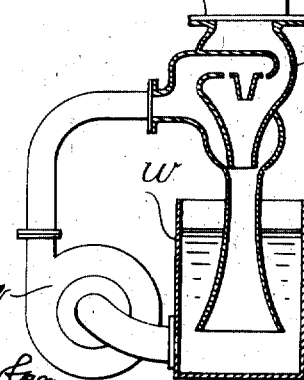

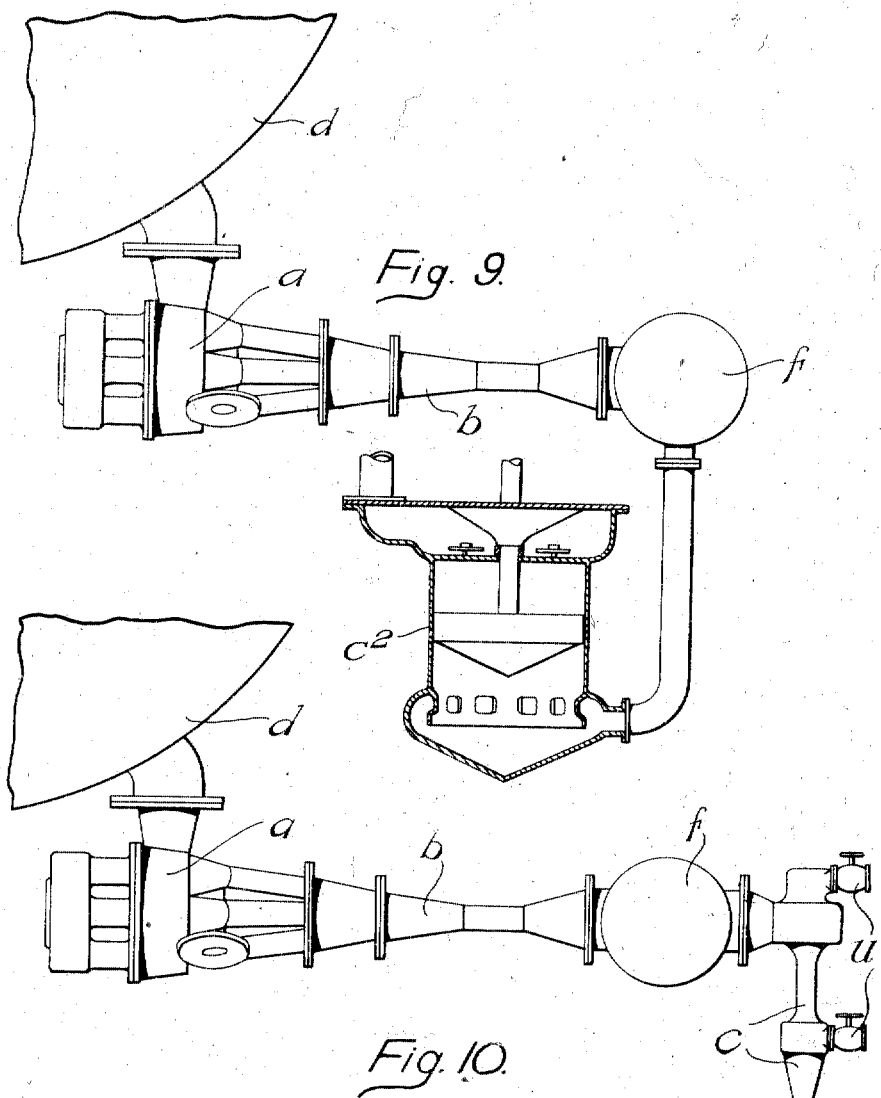

UNITED STATES PATENT OFFICE.

DONALD BARNS MORISON, OF HARTLEPOOL, ENGLAND.

APPARATUS FOR WITHDRAWING FLUIDS FROM VESSELS.

1,280,809.  Specification of Letters Patent.  Patented Oct. 8, 1918.

Application filed August 8, 1918. Serial No. 248,988.

*To all whom it may concern:*

Be it known that I, DONALD BARNS MORISON, a subject of the King of Great Britain and Ireland, residing at Hartlepool, in the county of Durham, England, have invented the Improvements in Apparatus for Withdrawing Fluids from Vessels, of which the following is a specification.

This invention has for its object to provide useful and improved apparatus for the removal of fluids from vessels or chambers, and is particularly suitable for the withdrawal of aerated vapor from steam condensers under vacuum.

Apparatus in accordance with my invention comprises two ejector sections arranged in one unit, the first section consisting of a plurality of ejectors operating in parallel, leading from one or more suction chambers, and arranged around the axis of an ejector which forms the second section, the discharge from the ejectors of the first section being around, or forming an annulus around, the nozzle of the ejector of the second section. The axes of the ejectors in the first section preferably converge to a point in advance of but on the axis of the ejector forming the second section.

Between the discharge ends of the combining tubes of the ejectors in the first section and the point of delivery to the ejector forming the second section, I may provide a chamber or the like which is or may be divided by longitudinal guide vanes or their equivalent into passages through which the discharge from the first section is delivered into the second section. These passages, when employed, are gradually developed, as by the longitudinal guide vanes, so as to terminate in an annulus through which the discharge of the first section is delivered to the second section, the areas of successive cross sections in each of said passages being such, it may be, that the velocity of the discharge from the combining tubes of the first section and thence through said passages, is maintained approximately constant.

The nozzles of the ejectors may be supplied with operating fluid of any kind, but when supplied with steam, a steam supply chamber may be formed at a distance from the suction chamber of the first section in order to reduce the heating effect which the steam has on the fluid in the suction chamber of such section, and the connections between the two chambers may be of tubular form and contain steam supply pipes leading to the nozzles. With the same object, there may also be an air space between the combining tubes of the ejectors in the first section and the fluid supply passage to the ejector in the second section, the apparatus being conveniently divided or constructed in parts with the object of facilitating manufacture.

The operating fluid may be supplied to the ejectors at any suitable pressures, and it is to be understood that in all cases the proportions of the ejectors and the fluid pressures employed depend on the particular requirements for which the apparatus is used, for example, in the case of steam condensers the pressure or pressures of the operating fluid depend on the particular air and vacuum conditions associated with any particular plant.

The apparatus may be designed so that the ejector sections may be used separately or together. Furthermore, the design may be such that any one section has a greater discharging capacity than the other when used separately, so that by the use of either or both sections, varying discharging capacities can be obtained.

In the specification of my Letters Patent No. 1246771—1917 I have described air withdrawing apparatus comprising an air withdrawing ejector, a controlling ejector, and an air delivery ejector which operate in series under certain pressure differences. In the specification of an application made by me on the 25th October 1917, under Serial Number 198549, I have described the use of an air withdrawing ejector and a controlling ejector in combination in series with a water operated ejector or an air pump.

Apparatus constructed in accordance with my present invention may be very advantageously employed for use as the air withdrawing and controlling ejectors referred to in the above-mentioned specifications.

The accompanying drawings illustrate by way of example convenient forms and applications of my invention.

Figures 1, 2, 3, 4, 5 and 6 illustrate one convenient form of apparatus which is particularly suitable for the withdrawal and discharge of aerated vapor from steam condensers. Figs. 7, 8, 9 and 10 show the apparatus described with reference to Figs. 1 to 6 in combination with other discharging apparatus, which in the examples shown are employed for the removal of aerated vapor from steam condensers.

With reference to Figs. 1 to 6. Fig. 1 shows an elevation of a unit comprising two ejector sections $a$ and $b$, the part of the drawing above the center line being an outside view, and the part below a sectional view. The first section $a$ consists of a number of ejectors arranged in parallel, each ejector being formed by a nozzle $x$ and a combining tube $g$. The second section $b$ consists of a nozzle $v$ and a combining tube $h$.

Fig. 2 is a plan view, which shows on the left-hand side an outside view of the apparatus, and on the right-hand side a section on the line A—A in Fig. 1.

Fig. 3 is a view looking on the face of the flange $k$ in Fig. 1.

Fig. 4 shows at the left-hand side a half section on the line B—B, and on the right-hand side a half section on the line C—C in Fig. 1. Fig. 5 shows on the left-hand side a half section on the line D—D, and on the right-hand side a half section on the line E—E in Fig. 1, and Fig. 6 shows a section on the line F—F in Fig. 1.

Figure 1:
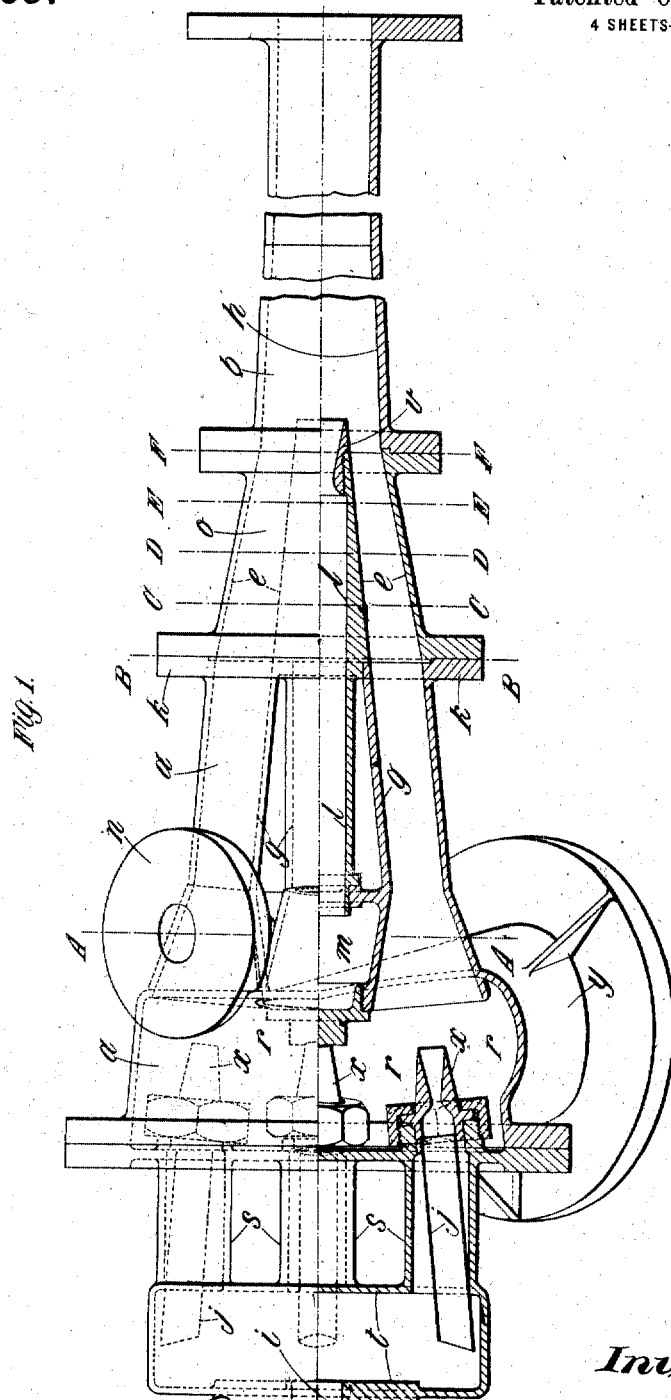

The sections shown in Figs. 4, 5 and 6 illustrate the longitudinal formation of the passages $e$.

The nozzles $x$ have a common suction chamber $r$ having an inlet branch $y$. The operating fluid, usually steam in the case of steam condensing plants, is supplied to the nozzles $x$ from a common supply chamber $t$, which, in order to reduce the heating effect which the steam supply to the nozzles has on the gas in the chamber $r$, is preferably formed at a distance from such chamber, the connections $s$ between the two chambers being of tubular form and containing the steam supply pipes $j$ which lead to the nozzles $x$, steam being supplied to the chamber $t$ through the inlet $i$. Similarly, the nozzle $v$ is provided with a fluid supply passage $l$ which leads from the chamber $m$, having an inlet branch $n$. The passages $e$ connecting the combining tubes $g$ with the combining tube $h$, are formed in a chamber $o$, which is herein referred to as a concentrating chamber. The interior of this concentrating chamber is divided by longitudinal guide vanes $p$ into the passages $e$, the areas through the successive cross sections in these passages as illustrated in Figs. 4, 5 and 6, being such that eddying is avoided and the velocity of the discharge therethrough is maintained approximately constant, the passages being gradually developed by the vanes $p$ so as to terminate in an annulus as shown in Fig. 6.

In a modification of the arrangement described the concentrating chamber $o$ may be omitted, and the combining tubes $g$ continued into the combining tube $h$, but I have found the arrangement previously described to be more efficient, especially when the apparatus is employed in place of the air withdrawing ejector and the controlling ejector or ejectors in apparatus according to specifications of Letters Patent No. 1246771—1917 and application Serial Number 198549—1917.

In Fig. 7 the apparatus illustrated in Figs. 1 to 6 is shown in combination with a steam operated ejector $c$ for the removal of aerated vapor from the condenser $d$, an intermediate condensing receiver $f$ being provided between the second ejector section $b$ and the ejector $c$. If the conditions are such that the condensing receiver $f$ is not required, it may be omitted.

In Fig. 8 the apparatus illustrated with reference to Figs. 1 to 6 is shown in combination with a water operated ejector $c^1$ for the removal of aerated vapor from the condenser $d$, the ejector $c^1$ being supplied with water from the tank $w$ by the pump $q$ in a known way.

In Fig. 9 the apparatus described with reference to Figs. 1 to 6 is shown in combination with a mechanical air pump $c^2$ for the removal of aerated vapor from the condenser $d$, a condensing receiver $f$ being, in this example, placed between the second ejector section $b$ and the pump $c^2$.

Fig. 10 is a modification of Fig. 7, and shows the ejector sections $a$, $b$, in series with a steam operated ejector $c$ which comprises groups of nozzles supplied with steam through valves $u$. The intermediate condensing receiver $f$ may be omitted if desired.

The arrangements illustrated in Figs. 7, 8, 9 and 10 may be operated in any convenient manner, but I have found the arrangements to be particularly efficient when the first and second sections $a$, $b$, of the ejector unit are designed for and operated respectively under the pressure differences referred to with reference to the air withdrawing and controlling ejectors described in the specification of Letters Patent No. 1246771—1917.

What I claim is:—

1. Apparatus for withdrawing fluids from vessels comprising a central ejector nozzle, a combining tube extending from said nozzle, a plurality of ejector nozzles arranged annularly behind said central nozzle, combining tubes arranged around said central nozzle into which said plurality of nozzles discharge, the combining tube of said central nozzle forming an extension of the combining tubes of said plurality of nozzles and means for introducing pressure fluid to operate all said nozzles.

2. Apparatus for withdrawing fluids from vessels comprising a central ejector nozzle, a combining tube extending from said nozzle, a plurality of ejector nozzles arranged annularly behind said central nozzle and converging toward a point in advance of and on the axis of said central nozzle, combining tubes arranged around said central nozzle into which said plurality of nozzles discharge, the combining tube of said central nozzle forming an extension of the combining tubes of said plurality of nozzles and means for introducing pressure fluid to operate all said nozzles.

3. Apparatus for withdrawing fluids from vessels comprising a central ejector nozzle, a combining tube extending from said nozzle, a plurality of ejector nozzles operating in parallel arranged annularly behind said central nozzle and converging toward a point in advance of and on the axis of said central nozzle, combining tubes arranged around said central nozzle into which said plurality of nozzles discharge, the combining tube of said central nozzle forming an extension of the combining tubes of said plurality of nozzles and means for introducing pressure fluid to operate all said nozzles.

4. Apparatus for withdrawing fluids from vessels comprising a first ejector section consisting of a plurality of ejectors each comprising a nozzle and combining tube and a second ejector section consisting of a central nozzle and combining tube, the combining tubes of the first ejector section being arranged around the nozzle of the second ejector section and being connected up to the combining tube of said second ejector section.

5. Apparatus for withdrawing fluids from vessels comprising a first ejector section consisting of a plurality of converging ejectors each comprising a nozzle and combining tube and a second ejector section consisting of a central nozzle and combining tube, the combining tubes of the first ejector section being arranged around the nozzle of the second ejector section and being connected up to the combining tube of said second ejector section.

6. Apparatus for withdrawing fluids from vessels comprising a first ejector section consisting of a plurality of ejectors each comprising a nozzle and combining tube and a second ejector section consisting of a central nozzle and combining tube, the combining tubes of the first ejector section being arranged around the nozzle of the second ejector section and being connected up to the combining tube of said second ejector section, and the ejector nozzles of said first ejector section converging toward a point located in advance of and on the axis of the nozzle of said second ejector section.

7. Apparatus for withdrawing fluids from vessels comprising a first ejector section consisting of a plurality of ejectors each comprising a nozzle and combining tube and a second ejector section consisting of a central nozzle and combining tube, the combining tubes of the first ejector section being arranged around the nozzle of the second ejector section and delivering to an annulus connected up to the combining tube of said second ejector section.

8. Apparatus for withdrawing fluids from vessels comprising a first ejector section consisting of a plurality of ejectors each comprising a nozzle and combining tube, a second ejector section consisting of a central nozzle and combining tube, the combining tubes of the first ejector section being arranged around the nozzle of the second ejector section and a chamber connecting the combining tubes of the first ejector section to the combining tube of said second ejector section.

9. Apparatus for withdrawing fluids from vessels comprising a first ejector section consisting of a plurality of ejectors each comprising a nozzle and combining tube, a second ejector section consisting of a central nozzle and combining tube, the combining tubes of the first ejector section being arranged around the nozzle of the second ejector section and a chamber connecting the combining tubes of the first ejector section to the combining tube of said second ejector section, said chamber having passages gradually developing to an annulus.

10 Apparatus for withdrawing fluids from vessels comprising a first ejector section consisting of a plurality of ejectors each comprising a nozzle and combining tube and a second ejector section consisting of a central nozzle and combining tube, the combining tubes of the first ejector section being arranged around the nozzle of the second ejector section and a chamber connecting the combining tubes of the first ejector section to the combining tube of said second ejector section, said chamber having passages in which the successive cross sectional areas are such that the velocity of discharge from the combining tubes of the first section and thence through said passages to the second section is maintained approximately constant.

11. Apparatus for withdrawing fluids from vessels comprising a first ejector section consisting of a plurality of ejectors in parallel each comprising a nozzle and combining tube and a common chamber to which pressure fluid is introduced to operate all said nozzles and a second ejector section consisting of a central nozzle and combining tube and a pressure fluid chamber to which pressure fluid is introduced to operate said nozzle, the combining tubes of the first ejector section being arranged around the nozzle of the second ejector section and being connected up to the combining tube of said second ejector section.

12. Apparatus for withdrawing fluids from vessels comprising a first ejector section consisting of a plurality of ejectors each comprising a nozzle and combining tube, a second ejector section consisting of a central nozzle and combining tube, the combining tubes of the first ejector section being arranged around the nozzle of the second ejector section and being connected up to the combining tube of said second ejector section and a steam operated ejector having its combining tube in series with the combining tube of said second ejector section.

13. Apparatus for withdrawing fluids from vessels comprising a first ejector section consisting of a plurality of ejectors each comprising a nozzle and combining tube, a second ejector section consisting of a central nozzle and combining tube, the combining tubes of the first ejector section being arranged around the nozzle of the second ejector section and being connected up to the combining tube of said second ejector section, a steam operated ejector having its combining tube in series with the combining tube of said second ejector section, and a main condenser to which said first ejector section is operatively coupled.

14. Apparatus for withdrawing fluids from vessels comprising a first ejector section consisting of a plurality of ejectors each comprising a nozzle and combining tube, a second ejector section consisting of a central nozzle and combining tube, the combining tubes of the first ejector section being arranged around the nozzle of the second ejector section and being connected up to the combining tube of said second ejector section, a steam operated ejector having its combining tube in series with the combining tube of said second ejector section, a main condenser to which said first ejector section is operatively coupled and a second condenser receiver interposed between said second ejector section and said steam operated ejector.

15. Apparatus for withdrawing fluids from vessels comprising a first ejector section consisting of a plurality of ejectors each comprising a nozzle and combining tube, a second ejector section consisting of a central nozzle and combining tube, the combining tubes of the first ejector section being arranged around the nozzle of the second ejector section and being connected up to the combining tube of said second ejector section, a water operated ejector having its combining tube in series with the combining tube of said second ejector section, a water tank into which said water operated ejector discharges, a pump connected to said tank and a discharge passage from said pump through which water is discharged by said pump to operate said water operated ejector.

16. Apparatus for withdrawing fluids from vessels comprising a first ejector section consisting of a plurality of ejectors each comprising a nozzle and combining tube, a second ejector section consisting of a central nozzle and combining tube, the combining tubes of the first ejector section being arranged around the nozzle of the second ejector section and being connected up to the combining tube of said second ejector section and an air pump having its suction passage in series with the combining tube of said second ejector section.

17. Apparatus for withdrawing fluids from vessels comprising a first ejector section consisting of a plurality of ejectors each comprising a nozzle and combining tube, a second ejector section consisting of a central nozzle and combining tube, the combining tubes of the first ejector section being arranged around the nozzle of the second ejector section and being connected up to the combining tube of said second ejector section, an air pump having its suction passage in series with the combining tube of said second ejector section, and a main condenser to which said first ejector section is operatively coupled.

18. Apparatus for withdrawing fluids from vessels comprising a first ejector section consisting of a plurality of ejectors each comprising a nozzle and combining tube, a second ejector section consisting of a central nozzle and combining tube, the combining tubes of the first ejector section being arranged around the nozzle of the second ejector section and being connected up to the combining tube of said second ejector section, an air pump having its suction passage in series with the combining tube of said second ejector section, a main condenser to which said first ejector section is operatively coupled and a condensing receiver interposed between said second section and said air pump.

19. Apparatus for withdrawing fluids from vessels comprising a first ejector section consisting of a plurality of ejectors each comprising a nozzle and combining tube, a second ejector section consisting of a central nozzle and combining tube, the combining tubes of the first ejector section being arranged around the nozzle of the second ejector section and being connected up to the combining tube of said second ejector section and a group of steam operated ejectors in series with the combining tube of said second ejector section and valves controlling the nozzles of said group.

Signed at Hartlepool Engine Works, Hartlepool, Co. Durham, this fifth day of July 1918.

DONALD BARNS MORISON.

Witnesses:
S. ARMSTRONG,
WILLIAM E. LOVERIDGE.